US012568155B2

(12) United States Patent　　(10) Patent No.:　US 12,568,155 B2

Ferreira et al.　　(45) Date of Patent:　＊Mar. 3, 2026

(54) USING MACHINE LEARNING TO IDENTIFY ONE OR MORE SOFTWARE APPLICATIONS TO PERFORM A PARTICULAR TASK

(71) Applicant: Aixplain, Inc., Los Gatos, CA (US)

(72) Inventors: Thiago Castro Ferreira, Rio de Janeiro (BR); Lucas Aguiar Pavanelli, Rio de Janeiro (BR); Mohamed Elbadrashiny, Staten Island, NY (US); Kamer Ali Yuksel, Munchen (DK); Hassan Sawaf, Los Gatos, CA (US)

(73) Assignee: Aixplain, Inc., San Jose, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 18/736,078

(22) Filed: Jun. 6, 2024

(65) Prior Publication Data

US 2024/0323264 A1　　Sep. 26, 2024

Related U.S. Application Data

(63) Continuation of application No. 17/976,704, filed on Oct. 28, 2022, now Pat. No. 12,041,148.

(51) Int. Cl.
　　*H04L 67/60*　　(2022.01)
　　*G06F 11/34*　　(2006.01)
(52) U.S. Cl.
　　CPC .......... *H04L 67/60* (2022.05); *G06F 11/3409* (2013.01)
(58) Field of Classification Search
　　CPC ........................... H04L 67/60; G06F 11/3409
(Continued)

(56) References Cited

U.S. PATENT DOCUMENTS

2018/0349514 A1 * 12/2018 Alzate Perez .... G06F 16/90332
2020/0065736 A1 * 2/2020 Relangi .................. G06N 20/20
(Continued)

OTHER PUBLICATIONS

A Prediction Model Optimization Critiques through Centroid Clustering by Reducing the Sample Size, Integrating Statistical and Machine Learning Techniques for Wheat Productivity (Mar. 11, 2022) Islam, Muhammad and Shehzad, Farrukh (pp. 1-11).*

*Primary Examiner* — Tauqir Hussain
(74) *Attorney, Agent, or Firm* — FP—General; Shiv S Naimpally

(57) ABSTRACT

In some examples, a server instructs individual software applications to process individual tasks and determines a plurality of outputs resulting from processing. The server determines, based on the plurality of outputs, individual performance scores associated with individual software applications, and determines individual features associated with individual task data of multiple task data. The server receives task data associated with a task, determines at least one feature associated with the task data based on analyzing the task data and predicts, using at least one machine learning model, the individual performance scores associated with the individual software applications that have processed the task. The server selects at least one software application from the plurality of software applications based on an associated performance score, generates a recommendation of the at least one software application, and transmits the recommendation to the user device.

20 Claims, 21 Drawing Sheets

(58) Field of Classification Search

USPC ........................................................ 709/203

See application file for complete search history.

(56) References Cited

U.S. PATENT DOCUMENTS

| | | | | |
|---|---|---|---|---|
| 2021/0123771 | A1* | 4/2021 | Vega | H04Q 9/00 |
| 2021/0125129 | A1* | 4/2021 | Vega | G06Q 10/06315 |
| 2021/0125253 | A1* | 4/2021 | Vega | H04L 67/12 |
| 2021/0133658 | A1* | 5/2021 | Relangi | G06N 20/00 |
| 2021/0158221 | A1* | 5/2021 | Marlin | G06F 11/079 |
| 2023/0004486 | A1* | 1/2023 | Drozhak | G06F 11/368 |
| 2023/0335287 | A1* | 10/2023 | Miller | G16H 50/80 |

* cited by examiner

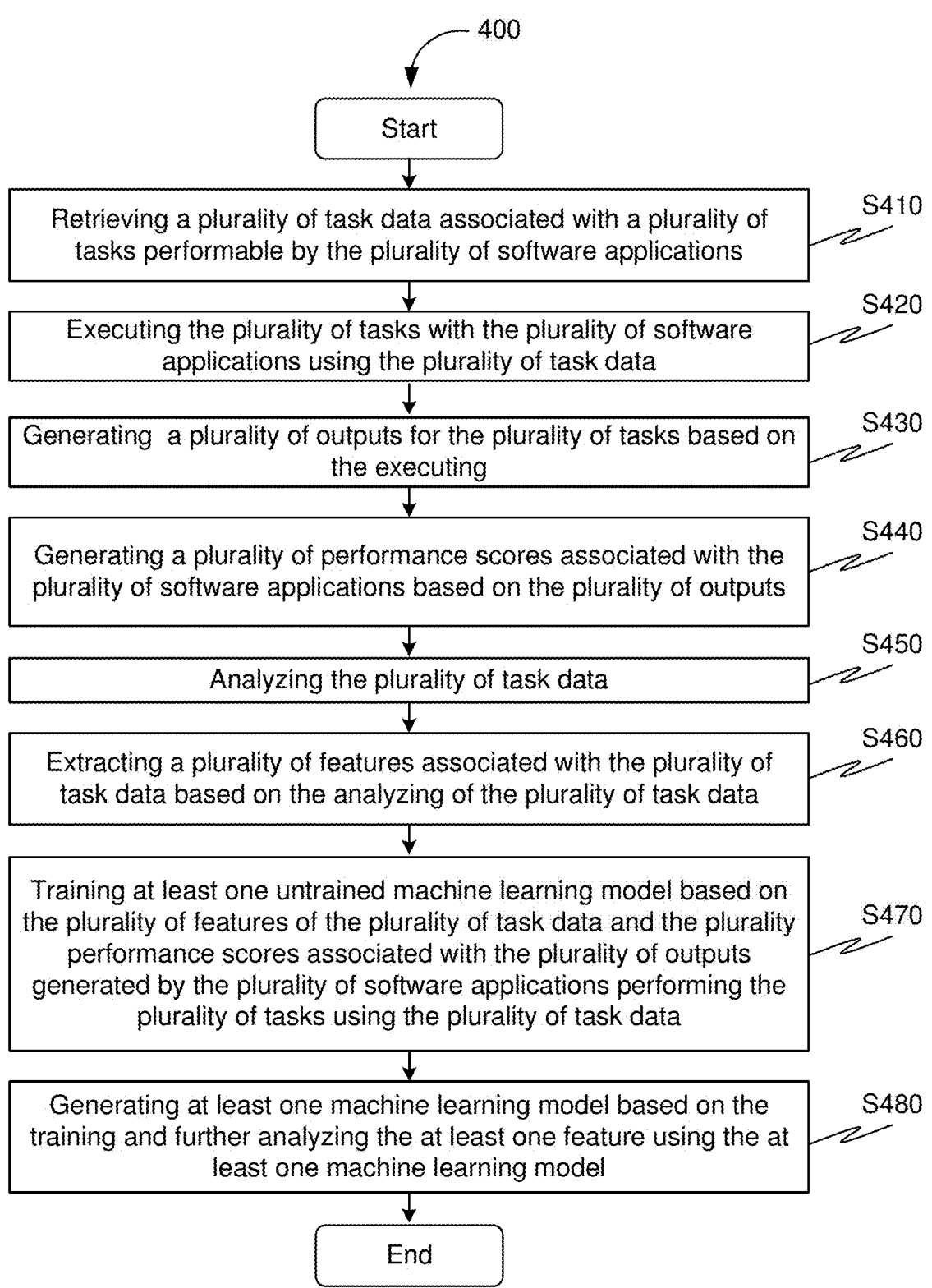

400

Start

Retrieving a plurality of task data associated with a plurality of tasks performable by the plurality of software applications
S410

Executing the plurality of tasks with the plurality of software applications using the plurality of task data
S420

Generating a plurality of outputs for the plurality of tasks based on the executing
S430

Generating a plurality of performance scores associated with the plurality of software applications based on the plurality of outputs
S440

Analyzing the plurality of task data
S450

Extracting a plurality of features associated with the plurality of task data based on the analyzing of the plurality of task data
S460

Training at least one untrained machine learning model based on the plurality of features of the plurality of task data and the plurality performance scores associated with the plurality of outputs generated by the plurality of software applications performing the plurality of tasks using the plurality of task data
S470

Generating at least one machine learning model based on the training and further analyzing the at least one feature using the at least one machine learning model
S480

End

Start

S510

Analyzing the plurality of outputs based on at least one performance metric, and measuring a performance of the plurality of software applications

S520

Generating at least one value for the at least one performance metric for each of the plurality of outputs generated based on the analyzing of the plurality of task data and the plurality of outputs End

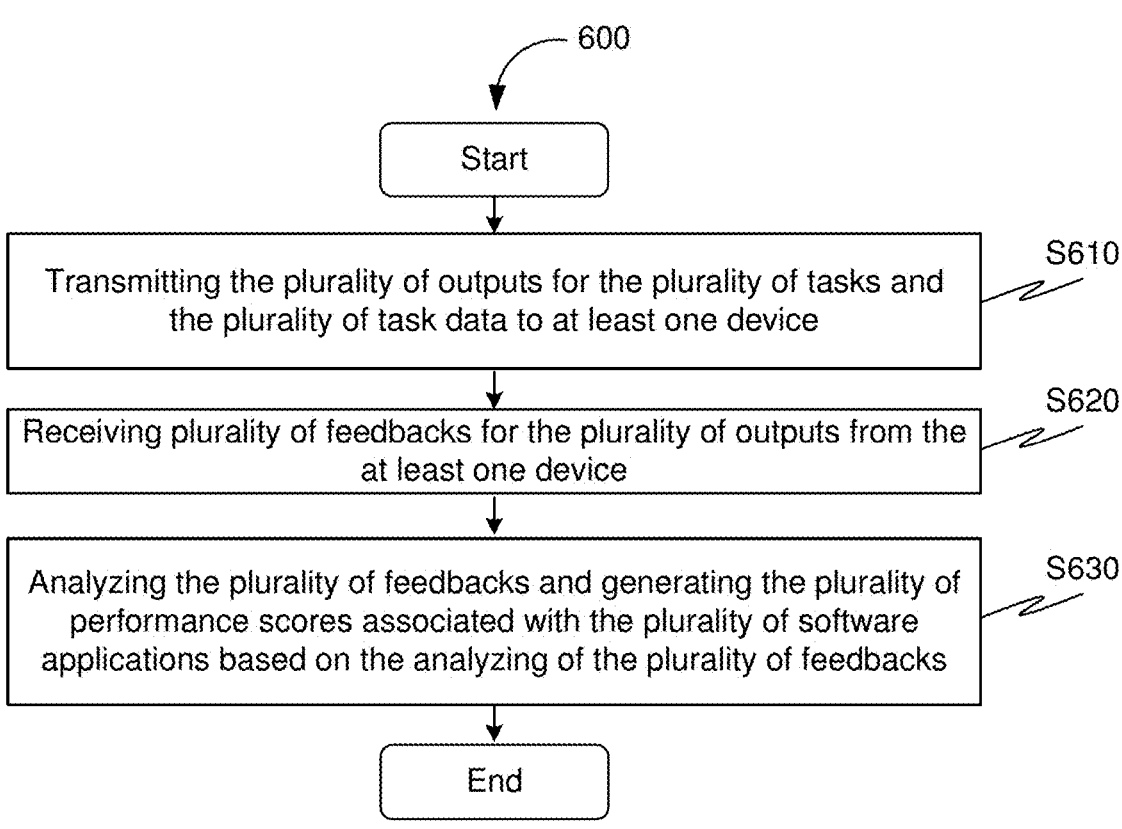

600

Start

Transmitting the plurality of outputs for the plurality of tasks and the plurality of task data to at least one device

S610

Receiving plurality of feedbacks for the plurality of outputs from the at least one device

S620

Analyzing the plurality of feedbacks and generating the plurality of performance scores associated with the plurality of software applications based on the analyzing of the plurality of feedbacks

S630

End

FIG. 6

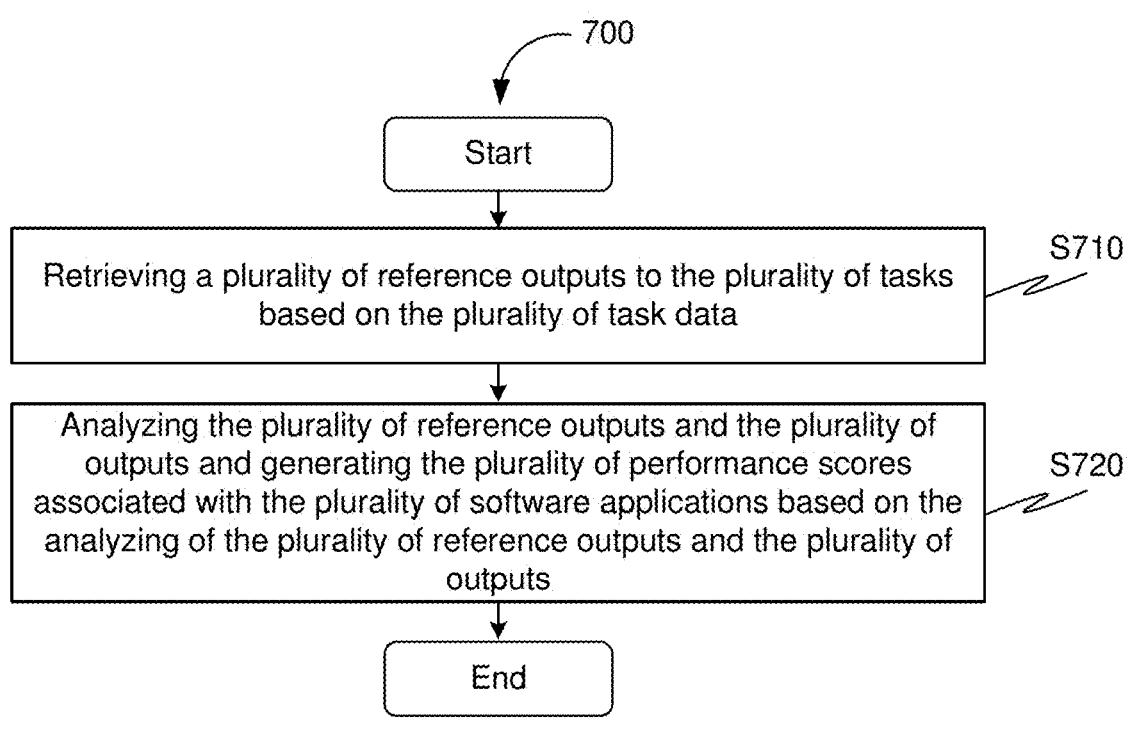

─ 700

Start

Retrieving a plurality of reference outputs to the plurality of tasks based on the plurality of task data
S710

Analyzing the plurality of reference outputs and the plurality of outputs and generating the plurality of performance scores associated with the plurality of software applications based on the analyzing of the plurality of reference outputs and the plurality of outputs
S720

End

FIG. 7

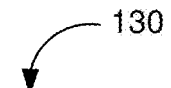
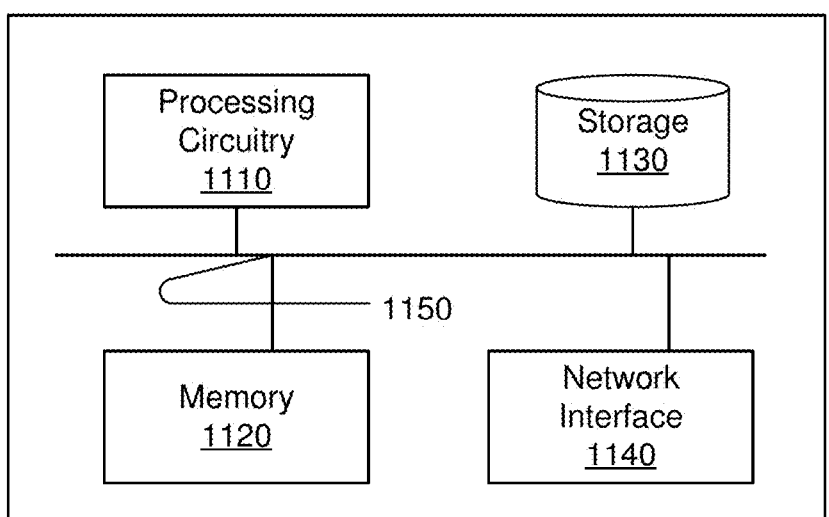
FIG. 11

— 1300

11
Source Text
Input

12
Feature
Extraction

13
Predict Quality
Scores of
Supplier

14
Choose supplier
with highest
quality score

15
Translate
source text
with chosen
supplier

16
Translation

| Model | BLEU | $\Delta_\$$ | chrF++ | $\Delta_\$$ | SBERT | $\Delta_\$$ | QE | $\Delta_\$$ | DA | $\Delta_\$$ |
|---|---|---|---|---|---|---|---|---|---|---|
| Supplier 1 | 28.40 | +48% | 52.03 | +33% | 89.84 | -1% | 45.11 | -16% | 43.11 | -3% |
| Supplier 2 | 29.62 | -1% | 52.54 | -11% | 89.32 | -34% | 45.35 | -44% | 43.21 | -35% |
| Supplier 3 | 29.68 | +98% | 52.27 | +77% | 89.72 | +32% | 48.00 | +12% | 47.44 | +29% |
| Supplier 4 | 30.58 | -21% | 53.10 | -29% | 88.64 | -47% | 46.42 | -55% | 45.71 | -48% |
| Supplier 5 | 27.23 | +98% | 50.53 | +77% | 88.47 | +32% | 41.21 | +12% | 35.36 | +29% |
| Supplier 6 | 29.45 | -60% | 51.94 | -65% | 88.41 | -74% | 45.06 | -78% | 42.36 | -74% |
| Automode | 30.81 | 0% | 53.36 | 0% | 90.05 | 0% | 48.11 | 0% | 48.44 | 0% |
| Upper Bound | 38.70 | 28% | 59.39 | +15% | 91.46 | -10% | 56.18 | -25% | 61.74 | -16% |

1500

| Model | cs-en | Δ$ | de-en | Δ$ | de-fr | Δ$ | en-cs | Δ$ | en-de | Δ$ |
|---|---|---|---|---|---|---|---|---|---|---|
| Supplier 1 | 53.38 | +57% | 50.43 | -7% | 23.21 | -9% | 68.94 | +15% | 43.76 | -20% |
| Supplier 2 | 48.88 | +5% | 53.86 | -37% | 28.35 | -40% | 67.86 | -24% | 42.23 | -47% |
| Supplier 3 | 56.95 | +109% | 53.55 | +24% | 29.41 | +21% | 74.71 | +53% | 46.56 | +6% |
| Supplier 4 | 56.83 | -16% | 52.88 | -50% | 28.58 | -52% | 74.00 | -39% | 42.41 | -58% |
| Supplier 5 | 43.81 | +109% | 48.08 | +24% | 9.00 | +21% | 58.62 | +53% | 40.00 | +6% |
| Supplier 6 | 55.45 | -59% | 50.12 | -75% | 26.08 | -76% | 69.55 | -69% | 40.47 | -78% |
| Automode | 58.70 | 0% | 53.89 | 0% | 29.61 | 0% | 74.82 | 0% | 46.86 | 0% |
| Upper Bound | 67.93 | +35% | 63.07 | -17% | 49.41 | -25% | 91.73 | +1% | 56.07 | -27% |

| Model | en-fi | $\Delta_S$ | en-ru | $\Delta_S$ | en-zh | $\Delta_S$ | fr-de | $\Delta_S$ | ru-en | $\Delta_S$ |
|---|---|---|---|---|---|---|---|---|---|---|
| Supplier 1 | 65.73 | +95% | 36.95 | -18% | 27.41 | -24% | 25.06 | -17% | 33.91 | -4% |
| Supplier 2 | 63.50 | +30% | 40.28 | -46% | 24.40 | -49% | 25.53 | -45% | 35.00 | -36% |
| Supplier 3 | 67.73 | +160% | 45.53 | +8% | 33.61 | +2% | 26.40 | +11% | 37.70 | +28% |
| Supplier 4 | 74.09 | +5% | 41.48 | -57% | 27.63 | -59% | 24.48 | -56% | 34.06 | -49% |
| Supplier 5 | 58.32 | +160% | 33.31 | +8% | 19.29 | +2% | 13.73 | +11% | 28.58 | +28% |
| Supplier 6 | 74.71 | -48% | 34.26 | -78% | 20.71 | -80% | 20.83 | -78% | 30.80 | -75% |
| Automode | 75.21 | 0% | 45.64 | 0% | 34.01 | 0% | 27.80 | 0% | 37.58 | 0% |
| Upper Bound | 92.29 | +53% | 59.99 | -26% | 47.77 | -32% | 43.39 | -30% | 49.25 | -11% |

1800

| Language | Train | Dev | Test |
|----------|-------|------|------|
| Chinese | 5,471 | 637 | 603 |
| English | 5,191 | 599 | 636 |
| French | 5,681 | 674 | 640 |
| German | 4,954 | 641 | 630 |
| Russian | 5,236 | 635 | 596 |
| Total | 26,533 | 3,186 | 3,105 |

| Model | de | en | fr | ru | zh-CH |
|---|---|---|---|---|---|
| Supplier 1 | 23.06 | 14.34 | 33.16 | 24.21 | 38.95 |
| Supplier 2 | 11.38 | 12.82 | 18.06 | 13.67 | 21.64 |
| Supplier 3 | 16.12 | 25.39 | 29.44 | 16.86 | 33.06 |
| Supplier 4 | 22.76 | 15.80 | 28.86 | 25.43 | 60.72 |
| Supplier 5 | 27.60 | 19.79 | 21.51 | 38.13 | - |
| Automode | 11.57 | 12.07 | 18.36 | 13.61 | 22.39 |
| Upper Bound | 6.38 | 7.31 | 11.01 | 8.45 | 16.46 |

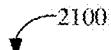
2100

| Model | Train | | | | Test | | | | Train multi-pair /test de-fr | |
|---|---|---|---|---|---|---|---|---|---|---|
| | de-fr | | multi-pair | | train/test de-fr | | train/test multi-pair | | | |
| | BLEU | COMET | BLEU | COMET | BLEU | COMET | BLEU | COMET | BLEU | COMET |
| Provider 1 | 0.2779 | 0.4303 | 0.2704 | 0.4766 | 0.3070 | 0.4406 | 0.2754 | 0.4801 | 0.3070 | 0.4406 |
| Provider 2 | 0.2921 | 0.4966 | 0.2819 | 0.4893 | 0.3494 | 0.4913 | 0.2854 | 0.4968 | 0.3494 | 0.4913 |
| Provider 3 | 0.3039 | 0.5067 | 0.3017 | 0.5440 | 0.3019 | 0.4587 | 0.3052 | 0.5465 | 0.3019 | 0.4587 |
| Provider 4 | 0.2625 | 0.2884 | 0.2634 | 0.4253 | 0.2407 | 0.1348 | 0.2681 | 0.4243 | 0.2407 | 0.1348 |
| Random | 0.2849 | 0.4354 | 0.2804 | 0.4853 | 0.2967 | 0.3979 | 0.2856 | 0.4905 | 0.2967 | 0.3979 |
| -Emb-Morph-SRC | 0.3173 | 0.5476 | 0.2861 | 0.5453 | 0.3189 | 0.4822 | 0.2800 | 0.5461 | 0.3096 | 0.4588 |
| -Emb-Morph+SRC | N/A | N/A | 0.2789 | 0.5463 | N/A | N/A | 0.2831 | 0.5482 | 0.3266 | 0.4940 |
| -Emb+Morph-SRC | 0.3043 | 0.5396 | 0.2824 | 0.5495 | 0.3223 | 0.4854 | 0.2828 | 0.5460 | 0.3175 | 0.4619 |
| -Emb+Morph+SRC | N/A | N/A | 0.2794 | 0.5471 | N/A | N/A | 0.2835 | 0.5477 | 0.3252 | 0.4910 |
| +Emb-Morph-SRC | 0.3030 | 0.5058 | 0.2717 | 0.5440 | 0.3301 | 0.4885 | 0.2772 | 0.5464 | 0.3070 | 0.4553 |
| +Emb-Morph+SRC | N/A | N/A | 0.2774 | 0.5454 | N/A | N/A | 0.2799 | 0.5478 | 0.3226 | 0.4900 |
| +Emb+Morph-SRC | 0.3120 | 0.5073 | 0.2723 | 0.5495 | 0.3155 | 0.4906 | 0.2775 | 0.5465 | 0.3065 | 0.4587 |
| +Emb+Morph+SRC | N/A | N/A | 0.2728 | 0.5454 | N/A | N/A | 0.2799 | 0.5477 | 0.3167 | 0.4913 |

FIG. 21

USING MACHINE LEARNING TO IDENTIFY ONE OR MORE SOFTWARE APPLICATIONS TO PERFORM A PARTICULAR TASK

CROSS REFERENCE TO RELATED APPLICATIONS

The present patent application is a continuation of U.S. patent application Ser. No. 17/976,704, filed on Oct. 28, 2022, entitled "SYSTEM AND METHOD FOR FACILITATING PERFORMING OF TASKS OPTIMALLY USING SOFTWARE APPLICATIONS" which is incorporated by reference herein in its entirety and for all purposes as if completely and fully set forth herein.

TECHNICAL FIELD

The present disclosure relates generally to the field of data processing, and more specifically, to systems and methods to use machine learning to identify one or more software applications to perform a particular task.

BACKGROUND

Machine Learning approaches have faced significant progress over the years, moving from rule-based approaches to data-driven ones, such as statistical and more recent deep learning techniques. Each progression has resulted in significant gains in the quality of the application outputs, and can be seen in crucial areas like Natural Language Processing and Computational Vision.

Due to the progress in Machine Learning applications and the quality of the produced outputs, the number of commercial ML applications in different fields has soared, being offered by different suppliers like Google, DeepL, Azure, Amazon Web Services (AWS), and the like. Given this wide range of options, users may actually be burdened by deciding on which service to use. On the other hand, instead of choosing a single service to solve all instances of a target task, having access to multiple services leave room for comparison in order to choose the best outcome for each input instance to be solved using Machine Learning.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

In some examples, a server instructs individual software applications of a plurality of software applications to process individual tasks of a plurality of tasks, determines a plurality of outputs resulting from the individual software applications processing the individual tasks, determines, based on the plurality of outputs, individual performance scores associated with individual software applications of the plurality of software applications, and determines individual features of a plurality of features associated with a plurality of task data associated with the plurality of tasks. The server receives task data associated with at least one task from a user device. The task data includes textual content, audio content, video content, or audio-video content.

The server determines at least one feature associated with the task data based on analyzing the task data and predicts, using at least one machine learning model, the individual performance scores associated with the individual software applications of the plurality of software applications that have processed the at least one task. The server selects at least one software application from the plurality of software applications based at least in part on an associated predicted performance score, generates a recommendation of the at least one software application based at least in part on the associated predicted performance score, and transmits the recommendation to the user device. The server may instruct the at least one software application to process the task data, determine an output of the at least one software application after processing the task data, and transmits the output to the user device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 4 is a flowchart of a method for training machine learning models for facilitating the performing of the tasks using the software applications, in accordance with some embodiments.

FIG. 6 is a flowchart of a method generating performance scores of the software applications using feedback for the training of the machine learning models, in accordance with some embodiments.

FIG. 7 is a flowchart of a method generating performance scores of the software applications using reference outputs for the tasks for the training of the machine learning models, in accordance with some embodiments.

FIG. 11 is an example schematic diagram of a system according to an embodiment.

FIG. 21 is a table depicting quality metrics based on translations of single-pair and multi-pair corpus by suppliers, in accordance with some embodiments.

DETAILED DESCRIPTION

Figure 1:
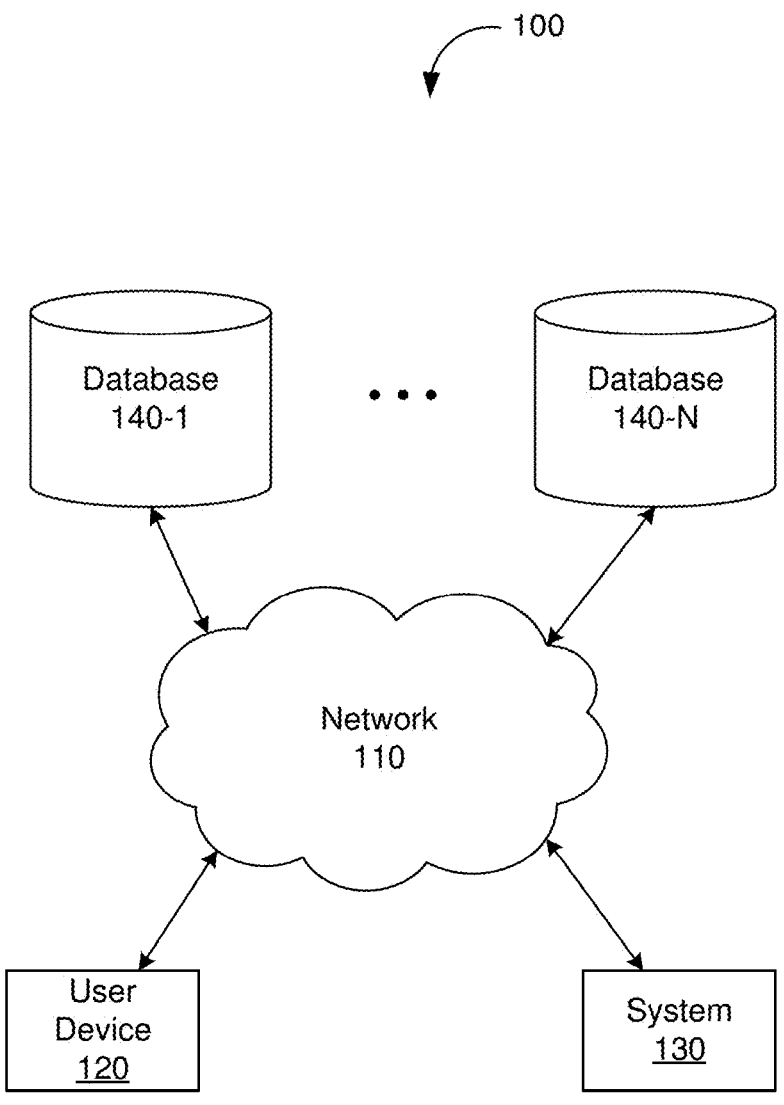
FIG. 1 shows an example network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The present disclosure is related to the wide field of Machine Learning (ML), which aims to study and develop computational applications able to "learn" how to solve a task based on data.

Further, for a given target task, the system is a recommended approach that aims to choose the ML supplier that is more likely to generate the best outcome to an input instance of the problem, unburdening users to manually perform the task from a wide range of supplier options.

The various disclosed embodiments include a method and system for identifying the most efficient machine learning algorithms to perform a set of one or more tasks.

In general, the method disclosed herein may be performed by one or more computing devices. Further, the system may be one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the processing device may be a computing device (a system with a processing circuitry). Further, the server computer may include a communication device configured for communicating with one or more external devices The one or more external devices may include, for example, but are not limited to, a client device, a third-party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the communication device may be a computing device (a system with a network interface). Further, the server computer may include a storage device configured for performing data storage and/or data retrieval operations. In general, the storage device may be configured for providing reliable storage of digital information. Accordingly, in some embodiments, the storage device may be based on technologies such as but not limited to, data compression, data backup, data redundancy, deduplication, error correction, data fingerprinting, role-based access control, and so on. Further, the processing device may be a computing device (a system with a memory).

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as but not limited to, fingerprint, palm-print, voice characteristics, behavioural characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touchscreen, a microphone, a camera, and so on. Likewise, the one or more steps may include receiving, using the communication device, the one or more embodied characteristics from one or more biometric sensors.

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, the present disclosure describes systems of methods of performing a plurality of tasks using Machine Learning (ML).

The present disclosure describes a system (e.g., Automode) and method that determine an improved choice amongst ML supplier offerings without burdening users. That is, as will be explained in further detail below, the system and method is configured to recommend the ML supplier that is more likely to generate the best outcome for each input instance of a target task.

According to some aspects, a method for performing a translation is disclosed. The method includes receiving a source text, extracting features of the source text, applying a trained translation model to predict quality scores respective to a plurality of translation applications, based on the extracted features, selecting a translation application with a highest predicted quality score from the predicted quality scores, translating the source text using the selected translation application, and outputting a translation based on the translating of the source text.

According to some other aspects, a method of training a translation model is disclosed. The method includes receiving a plurality of texts, translating the plurality of texts with a plurality of applications, rating a quality of the translation based on some quality metric such as human ratings, BLEU, METEOR, etc., building a parallel corpus between texts and the corresponding quality scores of the translations generated by the plurality of applications, receiving a source text, extracting features of the source text, training a multi-output regression model to predict the quality scores of the translations generated by the plurality of applications based on the input features, based on the input features, conducting an evaluation based on the regression result that is output, and creating a trained translation model based on the evaluation.

According to some other aspects, a method for performing a speech recognition is disclosed. The method includes receiving a source audio, extracting features of the source audio, applying a trained transcription model to predict quality scores respective to a plurality of transcription applications, based on the extracted features, selecting a transcription application with a highest predicted quality score from the predicted quality scores, transcribing the source audio using the selected translation application, and outputting a transcription based on the transcribing of the source audio.

According to some other aspects, a method of training a transcription model is disclosed. The method includes receiving a plurality of audio, transcribing the plurality of audio with a plurality of applications, rating a quality of the transcription based on some quality metric as human ratings, WER, etc., building a parallel corpus between texts and the corresponding quality scores of the translations generated by the plurality of applications, receiving a source audio, extracting features of the source audio, training a multi-output regression model to predict the quality scores of the transcriptions generated by the plurality of applications based on the input features, based on the input features, conducting an evaluation based on the regression result that is output, and creating a trained transcription model based on the evaluation.

For a matter of comparison, the system works for any task solved by at least two different Machine Learning applications whose quality of the outputs could be quantified somehow. Regarding the notation, given an instance/of a target task T and a set of applications S={Si, . . . , SM} (with M>2) which solves T, the system may generally be described by the following equation:

$$\text{System} = \text{argmax} Q(/, \text{Si}) \tag{1}$$

where Q is a function that aims to quantitatively rate the quality of a potential outcome of si to I (e.g. si(I)). As higher the result of Q, the better the quality of the potential outcome Si(I).

By itself, Q is a machine learning classification approach that predicts the quality of Si(/). To learn the task, a training set between input instances and the quality of Si(/) in comparison with a gold-standard outcome is required.

The system can be applied to a wide range of tasks. For example, the framework can be applied for the task of Automatic Speech Recognition to recommend the supplier whose software application is more likely to provide a good transcription of speech audio. In this case, a training set for Q would consist of speech audio as /, whereas the quality of the transcription produced by a supplier Si could be quantified with popular automatic metrics for the task such as the Word Error Rate (WER).

The system could also be an application for the task of Question-Answering (QA), where it could help in recommending a supplier that is more likely to provide the correct answer to a posed question. In a training set for QA, Q consists of the posed question as /, whereas the correctness of the answer produced by si could be measured by human ratings, contrasting Si(/) with a gold-standard target answer to /.

Additionally, the framework can also be trained to predict the supplier that is more likely to provide a good translation of a source text. For this task, a training set for Q consists of the source text as /, whereas the quality of a translation produced by si could be measured by human ratings or automatic ones generated by popular metrics such as BLEU, COMET-DA, etc. contrasting Si(/) with a gold-standard target translation to /.

FIG. 1 shows an example network diagram 100 utilized to describe the various disclosed embodiments. In the example network diagram 100, a user device 120, a system 130, and a plurality of databases 140-1 through 140-N (hereinafter referred to individually as a database 140 and collectively as databases 140, merely for simplicity purposes) are communicatively connected via a network 110. The network 110 may be but is not limited to, a wireless, cellular or wired network, a local area network (LAN), a wide area network (WAN), a metro area network (MAN), the Internet, the worldwide web (WWW), similar networks, and any combination thereof.

The user device (UD) 120 may be, but is not limited to, a personal computer, a laptop, a tablet computer, a smartphone, a wearable computing device, or any other device capable of receiving and displaying notifications.

Figure 2:
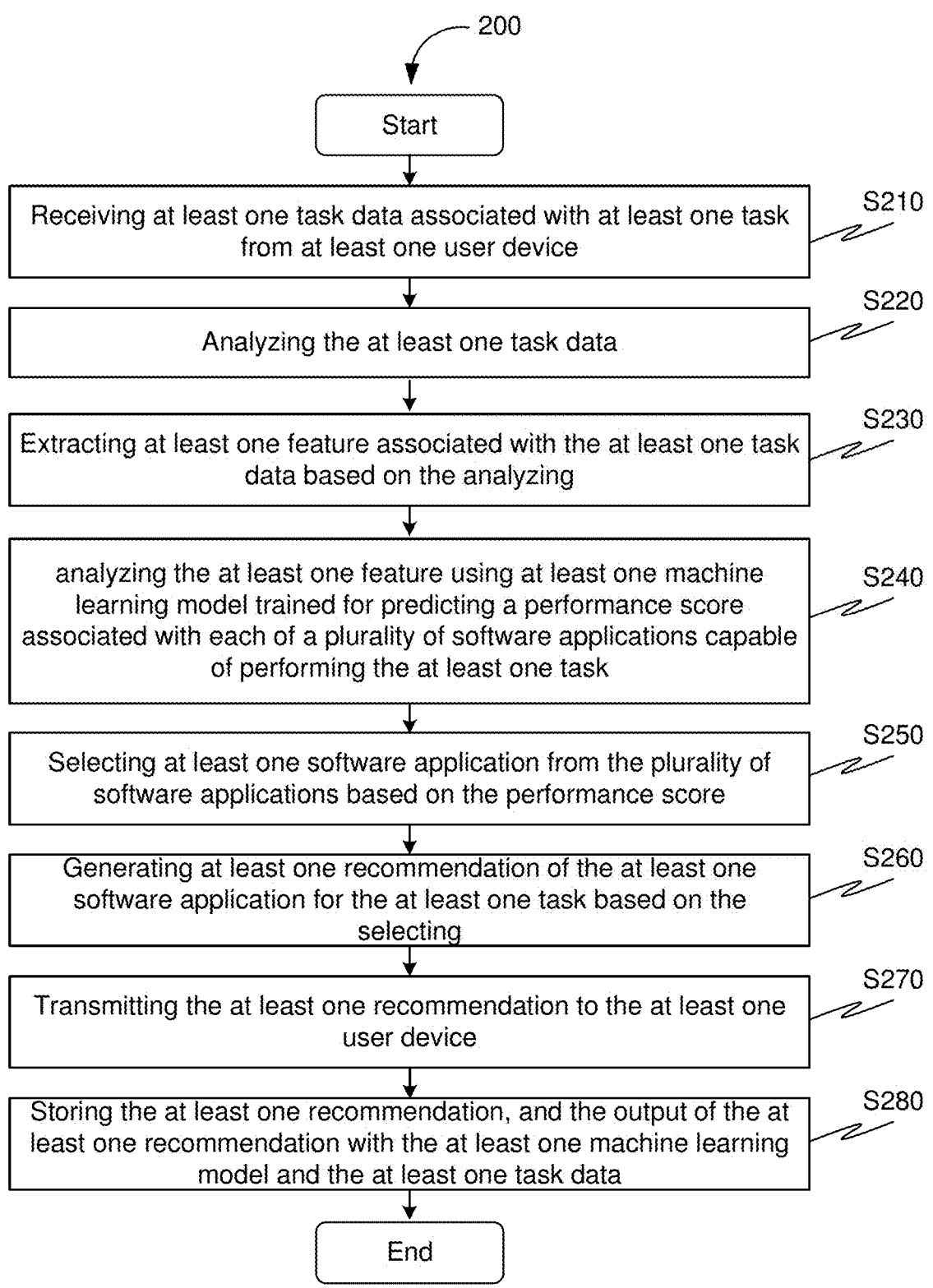
FIG. 2 is a flowchart of a method for facilitating performing of tasks using software applications, in accordance with some embodiments.

FIG. 2 is a flowchart of a method 200 for facilitating performing of tasks in an efficient way using software applications, in accordance with some embodiments. At step S210 using a communication device, at least one task data associated with at least one task is received from at least one user device. The at least one task data may include textual content, audio content, video content, audio-video content, etc. Further, the at least one task may include transcribing, translating, answering, etc. Further, the at least one user device may include a computing device such as a smartphone, a laptop, a desktop, a smartwatch, a client device, etc. Next, at step S220, using a processing device, the at least one task data is analyzed.

Thereafter, at S230, using the processing device, at least one feature associated with the at least one task data is extracted based on the analyzing. The at least one feature for the at least one task data including the textual content may include five groups of features. Further, the five groups of features may include Count, POS, NER, Morph, and Language. Count features consist of the number of tokens, characters, and the average word length of the source text. The POS features are a frequency of Part-of-Speech labels, such as nouns (NOUN), verbs (VERB), adjectives (ADJ), etc. The NER features refer to a frequency of Named Entity Recognition labels, like person (PER), location (LOC), organization (ORG), etc. The Morph features represent a frequency of morphological features such as number of words whose gender is female (Num Gender-Fem), number of words whose gender is male (Num Gender=Masc), number of imperative words (Num Aspect=Imp), etc. Further, the at least one feature for the at least one task data comprising the audio content may include language, pronunciation, etc.

After extraction, at S240, using the processing device, the at least one feature using at least one machine learning model is analyzed. The at least one machine learning model may be trained for predicting a performance score associated with each of a plurality of software applications capable of performing the at least one task. Also, the performance score corresponds to a performance of each of the plurality of software applications for performing the at least one task.

Further, the performance may be measured in terms of a quality of an output produced by the plurality of software applications, a speed at which the output may be produced by the plurality of software applications, a resource utilization (CPU usage, memory usage, network usage, etc.) by the plurality of software applications for producing the output, a fluency at which the output may be produced by the plurality of software applications, etc. Also, the plurality of software applications may include machine learning applications, machine translation services, open source software applications, web applications, etc. Further, the performance score may include a quality score, a fluency score, a speed score, a resource utilization score, etc.

Additionally, at S250 using the processing device, at least one software application from the plurality of software applications is selected based on the performance score. Further, the at least one software application may have a highest performance score among the performance score of the plurality of software applications. Next, at S260 using the processing device, at least one recommendation of the at least one software application, and the output of the recommendation for the at least one task is generated based on the selecting. The at least one recommendation may include at least one indication of the at least one software application. For instance, in a machine translation context, it will return the most likely translation service to provide the best translation, but also the translation itself. Thereafter, at S270 using the communication device, the at least one recommendation is transmitting to the at least one user device. Further, at step S280 using a storage device, the at least one recommendation, the output of the at least one recommendation, the at least one machine learning model, and the at least one task data are stored.

In further embodiments, the method 200 may include a step of analyzing, using the processing device, the at least one feature using at least one first machine learning model. The at least one first machine learning model may be trained for predicting a feasibility score associated with each of a plurality of software applications capable of performing the at least one task. Also, the selecting of the at least one software application from the plurality of software applications may be based on the feasibility score. Further, the performing of the at least one task with each of the plurality of software applications may be associated with a cost. Also, the feasibility score may be measured in terms of the cost of using each of the plurality of software applications. Further, the cost may refer to an amount needed for accessing each of the plurality of software applications. Also, the cost may correspond to an amount of resources (CPU usage, memory usage, network usage, etc.) needed by each of the plurality of software applications, and the performance of each of the plurality of software applications.

Further, in some embodiments, the analyzing of the at least one task data may include analyzing the at least one task data using at least one second machine learning model. Further, the extracting of the at least one feature may be based on the analyzing of the at least one task data using at least one second machine learning model. Further, the at least one second machine learning may include a natural language processing model such as Stanza for text inputs and SpeakerNet for audio ones.

Figure 3:
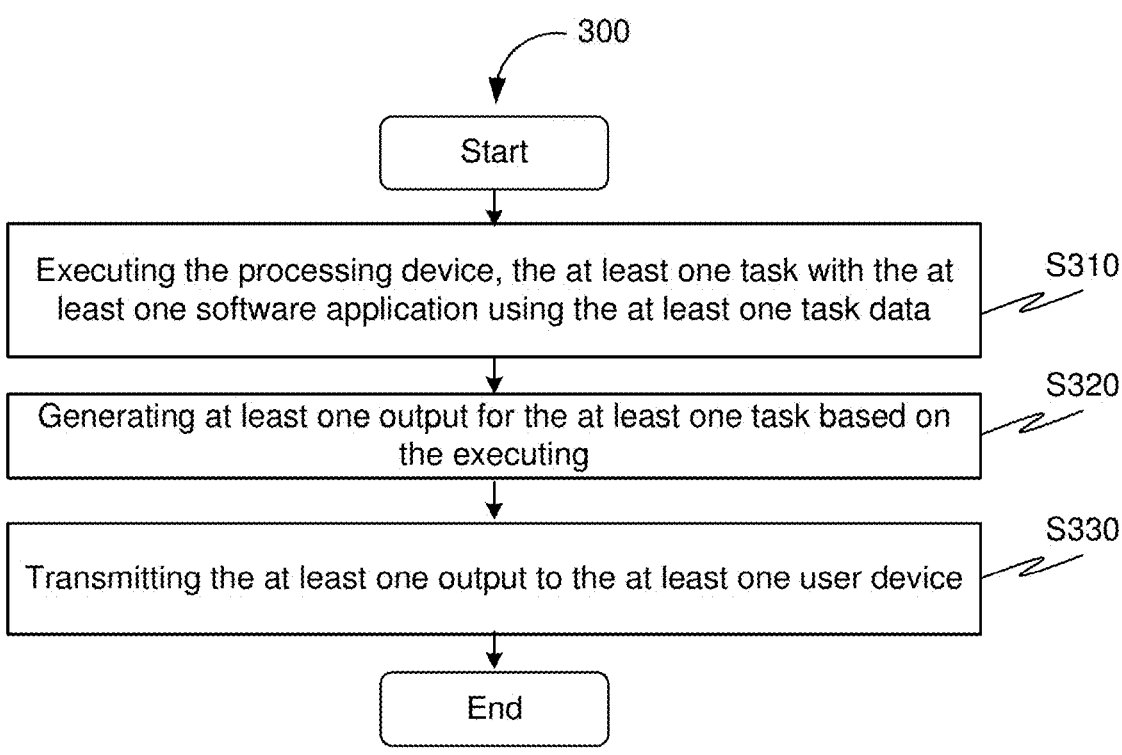
FIG. 3 is a flowchart of a method for generating outputs for the tasks, in accordance with some embodiments.

FIG. 3 is a flowchart of a method 300 for generating outputs for the tasks, in accordance with some embodiments. At S310, using the processing device, the at least one task is executed with the at least one software application using the at least one task data. Next, at S320 of using the processing device, at least one output for the at least one task is generated based on the executing. The at least one output may include at least one translation, at least one transcription, at least one answer, etc depending on the at least one task.

S330 of transmitting, using the communication device, the at least one output to the at least one user device.

FIG. 4 is a flowchart of a method 400 for training machine learning models for facilitating the performing of the tasks efficiently using the software applications, in accordance with some embodiments. At S410, using the storage device, a plurality of task data associated with the at least one task performable by the plurality of software applications is retrieved. The plurality of task data may be a list of textual content, audio content, video content, audio video content, etc. Also, the at least one task may include transcribing, translating, answering, etc.

Next, at S420, the at least one task is executed with the plurality of software applications using the plurality of task data. Afterwards, at S430, a plurality of outputs for the at least one task are outputted based on the executing. The plurality of outputs may include translations, transcriptions, answers, etc.

Then, at S440, using the processing device, a plurality of performance scores associated with the plurality of software applications is generated based on the plurality of outputs. Next, at S450, using the processing device, the plurality of task data is further analyzed. Thereafter, at S460, a plurality of features associated with the plurality of task data is extracted based on the analyzing of the plurality of task data.

Then, at S470, using the processing device, at least one untrained machine learning model is trained based on the plurality of features of the plurality of task data and the plurality performance scores associated with the plurality of outputs generated by the plurality of software applications performing the at least one task using the plurality of task data. The training may include training the at least one untrained machine learning model using data including the plurality of features of the plurality of task data, a plurality of reference outputs, the plurality of outputs, and the plurality of performance for the plurality of features.

Afterwards, at S480, using the processing device, the at least one machine learning model is generated based on the training. Also, in some embodiments, the at least one machine learning model may include at least one machine learning multi output regression model. Further, in some embodiments, the at least one machine learning model may be trained using a scikit-learn framework or pytorch.

Figure 5:
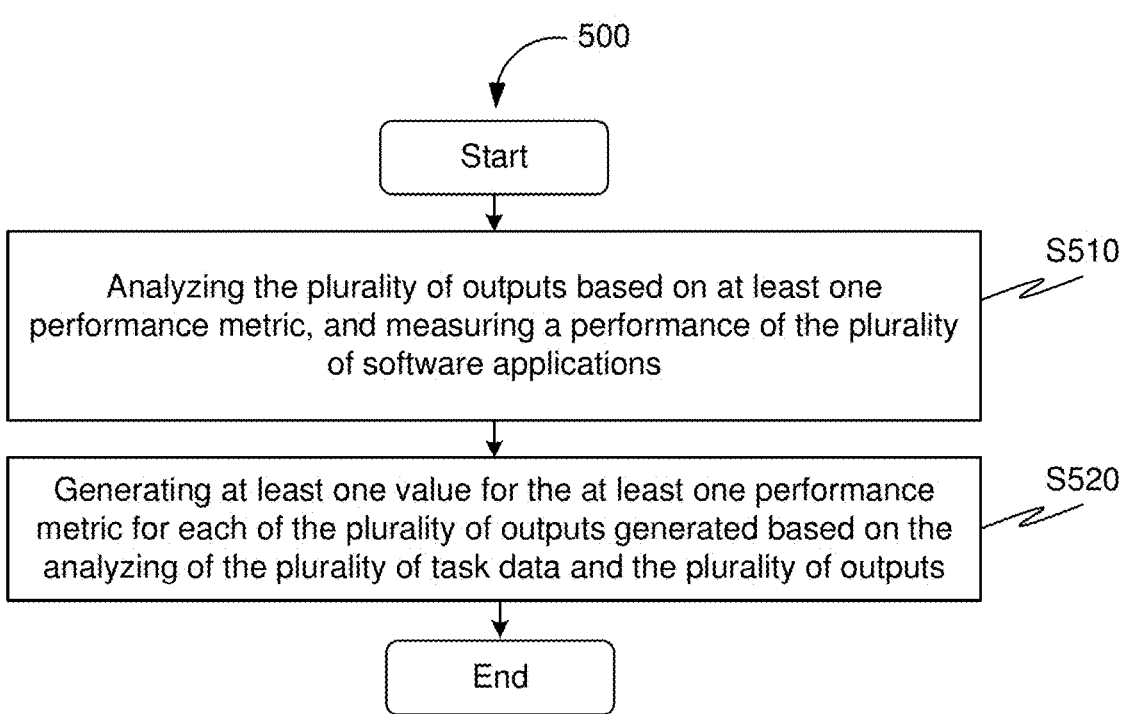
FIG. 5 is a flowchart of a method generating performance scores of the software applications using performance metrics for the training of the machine learning models, in accordance with some embodiments.

FIG. 5 is a flowchart of a method 500 of generating performance scores of the software applications using performance metrics for the training of the machine learning models, in accordance with some embodiments. At S510 using the processing device, the plurality of outputs are analyzed using at least one performance metric. The at least one performance metric may be used for measuring a performance of the plurality of software applications. Further, the at least one performance metric may include BLEU, chrF++, WER, COMET-OE, and COMET-DA, etc depending on the at least one task.

Next, at S520, using the processing device, at least one value for the at least one performance metric is generated for each of the plurality of outputs generated using the plurality of software applications based on the analyzing of the plurality of task data and the plurality of outputs. The generating of the plurality of performance scores associated with the plurality of software applications may be based on the at least one value for the at least one performance metric.

FIG. 6 is a flowchart of a method 600 of generating performance scores of the software applications using feedbacks for the training of the machine learning models, in accordance with some embodiments. At S610 using the communication device, the plurality of outputs are generated for the plurality of tasks and the plurality of task data to at least one device. Next, at S620, using the communication device, a plurality of feedbacks are received from the user, based on the the plurality of outputs transmitted to the at least one device. That is, each of the plurality of feedbacks may include a rating made by the user regarding the quality of the outputs. Further, the user may send the rating for at least one of the plurality of outputs using the at least one device. Further, the at least one device may be a computing device, a client device, etc.

Thereafter, at S630, using the processing device, the plurality of feedbacks are analyzed, and the plurality of performance scores associated with the plurality of software applications are generated based on the analyzing of the plurality of feedbacks.

FIG. 7 is a flowchart of a method 700 generating performance scores of the software applications using reference outputs for the tasks for the training of the machine learning models, in accordance with some embodiments. At, S710, using the storage device, a plurality of reference outputs to the plurality of tasks based on the plurality of task data are retrieved. The plurality of reference outputs may be an actual output for the plurality of tasks. Next, at S720, using the processing device, the plurality of reference outputs and the plurality of outputs are analyzed, the plurality of performance scores associated with the plurality of software applications may be generated based on the analyzing of the plurality of reference outputs and the plurality of outputs.

Figure 8:
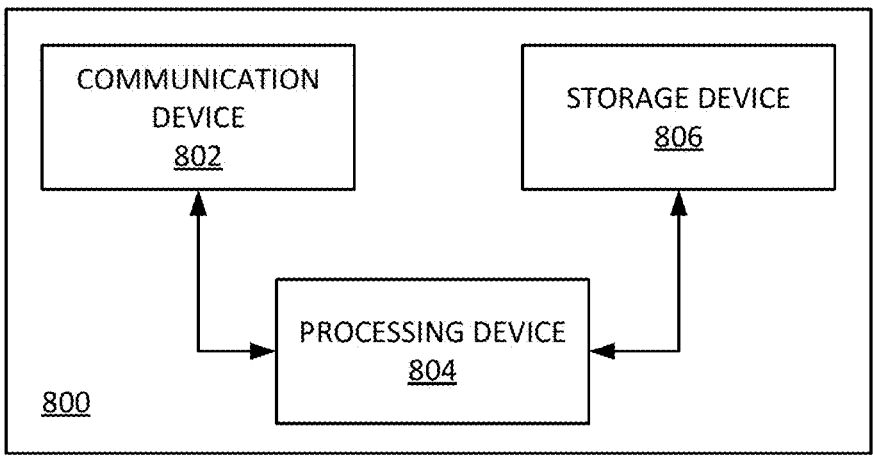
FIG. 8 is a block diagram of a system for facilitating performing of tasks using software applications, in accordance with some embodiments.

FIG. 8 is a block diagram of a system 800 for facilitating performing of tasks efficiently using software applications, in accordance with some embodiments. The system 800 may include a communication device 802, a processing device 804, and a storage device 806.

Figure 9:
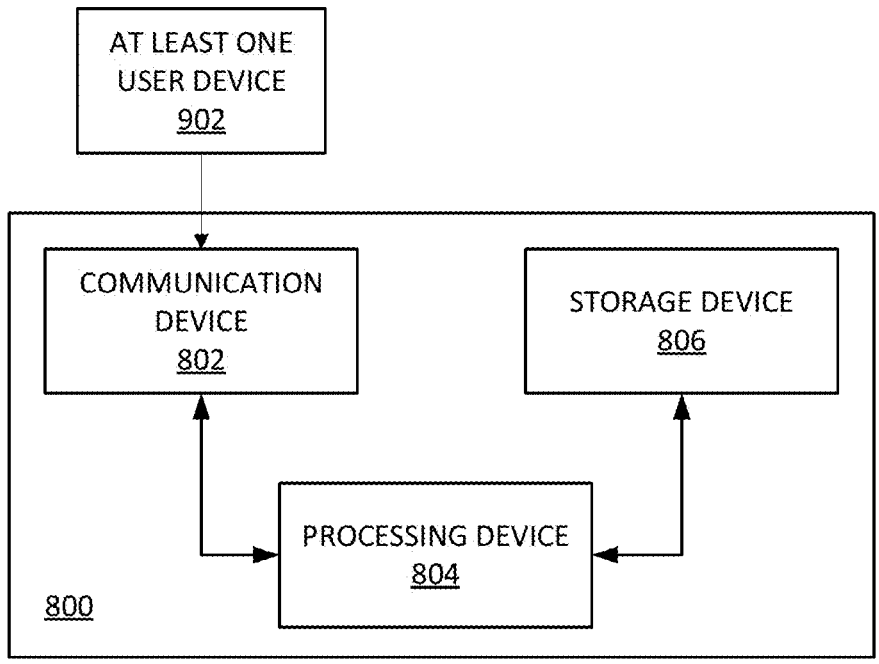
FIG. 9 is a block diagram of the system with the at least one user device, in accordance with some embodiments.

The communication device 802 may be configured to receive at least one task data associated with at least one task from at least one user device 902, as shown in FIG. 9. Also, the communication device 802 may be configured to transmit at least one recommendation to the at least one user device 902.

The processing device 804 may be communicatively coupled with the communication device 802. Also, the processing device 804 may be configured to analyze the at least one task data. Further, the processing device 804 may be configured to extract at least one feature associated with the at least one task data based on the analyzing. Also, the processing device 804 may be configured to analyze the at least one feature using at least one machine learning model. Further, the at least one machine learning model may be trained for predicting a performance score associated with each of a plurality of software applications capable of performing the at least one task. Also, the processing device 804 may be configured for selecting at least one software application from the plurality of software applications based on the performance score. Further, the processing device 804 may be configured for generate the at least one recommendation of the at least one software application for the at least one task based on the selecting.

The storage device 806 may be communicatively coupled with the processing device 804. Also, the storage device 806 may be configured to store the at least one machine learning model and the at least one task data along with the recommendation of the at least one application along with the output of the recommended application.

Further, in some embodiments, the processing device 804 may be configured to execute the at least one task with the at least one software application using the at least one task data. Also, the processing device 804 may be configured to generate at least one output for the at least one task based on the executing. Further, the communication device 802 may be configured to transmit the at least one output to the at least one user device 902.

Also, in some embodiments, the storage device 806 may be configured to retrieve a plurality of task data associated with a plurality of tasks performable by the plurality of software applications. Further, the processing device 804 may be configured to execute the plurality of tasks with the plurality of software applications using the plurality of task data. Also, the processing device 804 may be configured to generate a plurality of outputs for the plurality of tasks based on the executing. Further, the processing device 804 may be configured to generate a plurality of performance scores associated with the plurality of software applications based on the plurality of outputs. Further, the processing device 804 may be configured for analyzing the plurality of task data. Also, the processing device 804 may be configured to extract a plurality of features associated with the plurality of task data based on the analyzing of the plurality of task data. Further, the processing device 804 may be configured to train at least one untrained machine learning model based on the plurality of features of the plurality of task data and the plurality performance scores associated with the plurality of outputs generated by the plurality of software applications performing the plurality of tasks using the plurality of task data. Also, the processing device 804 may be configured for generate the at least one machine learning model based on the training, which may then be used to further analyze the at least one feature of the plurality of tasks performed by the plurality of the software applications to determine the quality of the plurality of the software applications.

Further, in an embodiment, the processing device 804 may be configured for analyzing the plurality of outputs using at least one performance metric. Further, the at least one performance metric may be used for measuring a performance of the plurality of software applications. Further, the processing device 804 may be configured for generating at least one value for the at least one performance metric for each of the plurality of outputs generated using the plurality of software applications based on the analyzing of the plurality of task data and the plurality of outputs. Further, the generating of the plurality of performance scores associated with the plurality of software applications may be based on the at least one value for the at least one performance metric.

Figure 10:
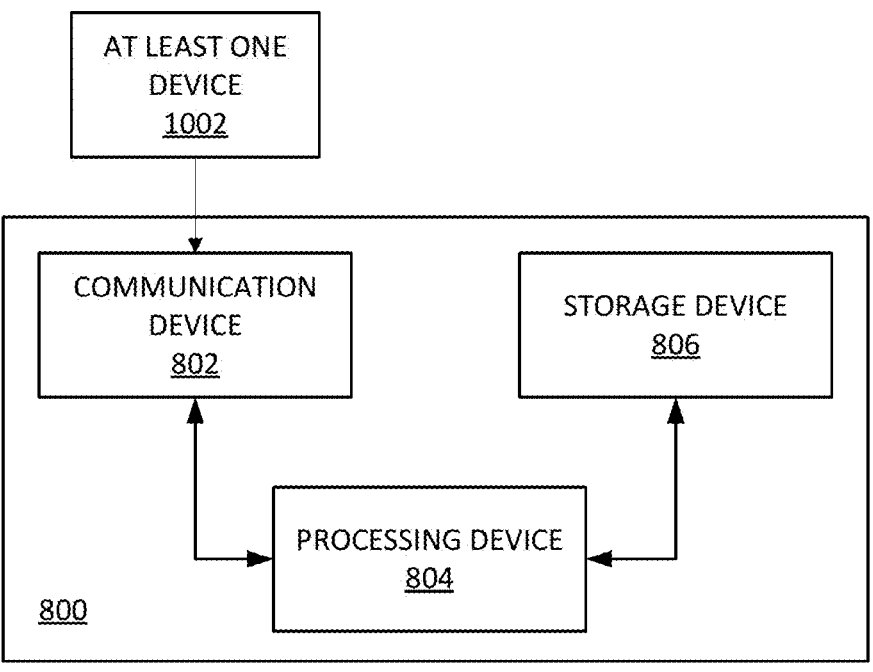
FIG. 10 is a block diagram of the system with the at least one device, in accordance with some embodiments.

Further, in an embodiment, the communication device 802 may be configured for transmitting the plurality of outputs for the plurality of tasks and the plurality of task data to at least one user device 1002, as shown in FIG. 10. Further, the communication device 802 may be configured for receiving a plurality of feedback for the plurality of outputs from the at least one user device 1002. Further, the processing device 804 may be configured for analyzing the plurality of feedback. Further, the generating of the plurality of performance scores associated with the plurality of software applications may be based on the analyzing of the plurality of feedback.

Further, in an embodiment, the storage device 806 may be configured for retrieving a plurality of reference outputs to the plurality of tasks based on the plurality of task data. Further, the processing device 804 may be configured for analyzing the plurality of reference outputs and the plurality of outputs. Further, the generating of the plurality of performance scores associated with the plurality of software applications may be based on the analyzing of the plurality of reference outputs and the plurality of outputs.

Further, in an embodiment, the at least one machine learning model may include at least one machine learning multi output regression model.

Further, in an embodiment, the at least one machine learning model may be trained using a scikit-learn framework or PyTorch one.

Further, in some embodiments, the processing device 804 may be configured for analyzing the at least one feature using at least one first machine learning model. Further, the at least one first machine learning model may be trained for predicting a feasibility score associated with each of a plurality of software applications capable of performing the at least one task. Further, the selecting of the at least one software application from the plurality of software applications may be further based on the feasibility score.

Further, in some embodiments, the analyzing of the at least one task data may include analyzing the at least one task data using at least one second machine learning model. Further, the extracting of the at least one feature may be further based on the analyzing of the at least one task data using at least one second machine learning model.

FIG. 9 is a block diagram of the system 800 with the at least one user device 902, in accordance with some embodiments.

FIG. 10 is a block diagram of the system 800 with the at least one user device 1002, in accordance with some embodiments.

FIG. 11 is an example schematic diagram of a system 130 according to an embodiment. The system 130 includes a processing circuitry 1110 coupled to a memory 1120, a storage 1130, and a network interface 1140 In an embodiment, the components of the system 130 may be communicatively connected via a bus 1150.

The processing circuitry 1110 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 1120 may be volatile (e.g., RAM, etc.), non-volatile (e.g., ROM, flash memory, etc.), or a combination thereof. In one configuration, computer readable instructions to implement one or more embodiments disclosed herein may be stored in the storage 1130.

In another embodiment, the memory 1120 is configured to store software Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 1110, cause the processing circuitry 1110 to perform the various processes described herein.

The storage 1130 may be magnetic storage, optical storage, and the like, and may be realized, for example, as flash memory or other memory technology, CD-ROM, Digital Versatile Disks (DVDs), or any other medium which can be used to store the desired information.

The network interface 1140 allows the system 130 to communicate with the agent for the purpose of, for example, receiving data, sending data, and the like. Further, the network interface 1140 allows the system 130 to communicate with the data sources 180 for the purpose of collecting vehicle data.

It should be understood that the embodiments described herein are not limited to the specific architecture illustrated in FIG. 11, and other architectures may be equally used without departing from the scope of the disclosed embodiments.

System Application on Machine Translation

Figure 12:
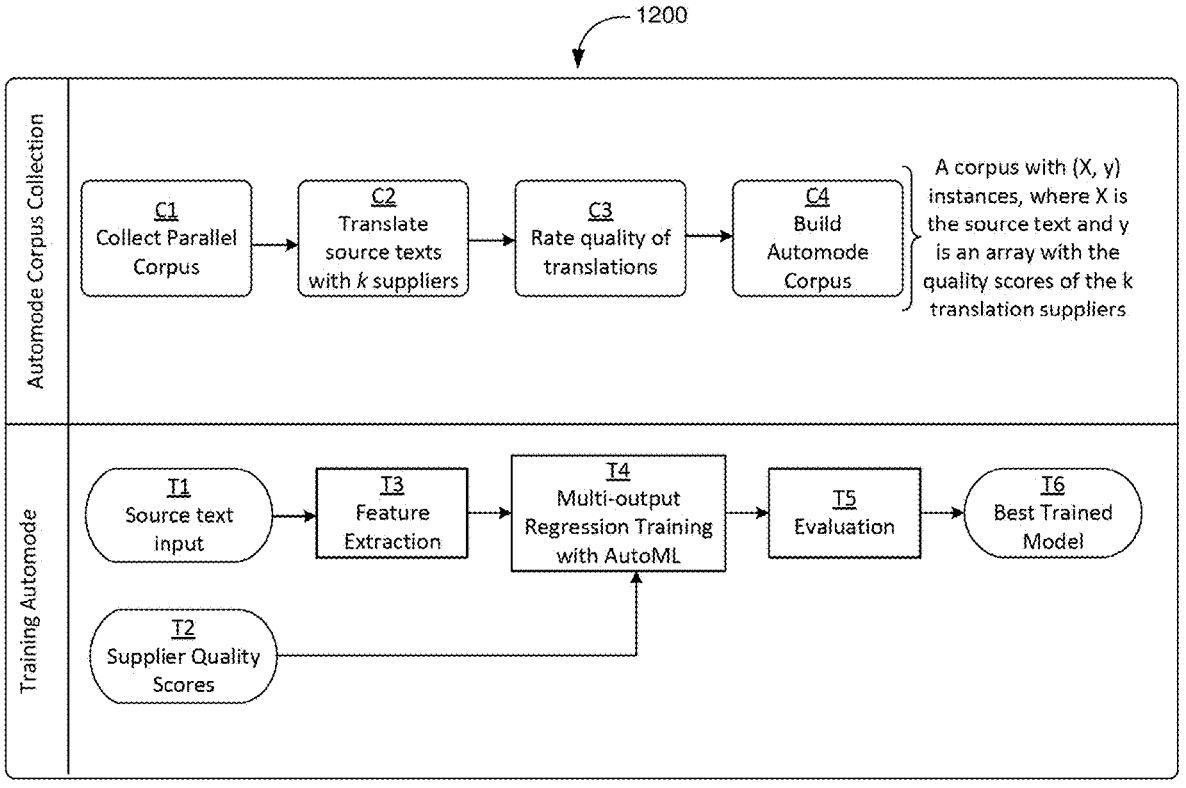
FIG. 12 is a flow diagram of a method for facilitating training models of System application for machine translation tasks, in accordance with some embodiments.
Figure 13:
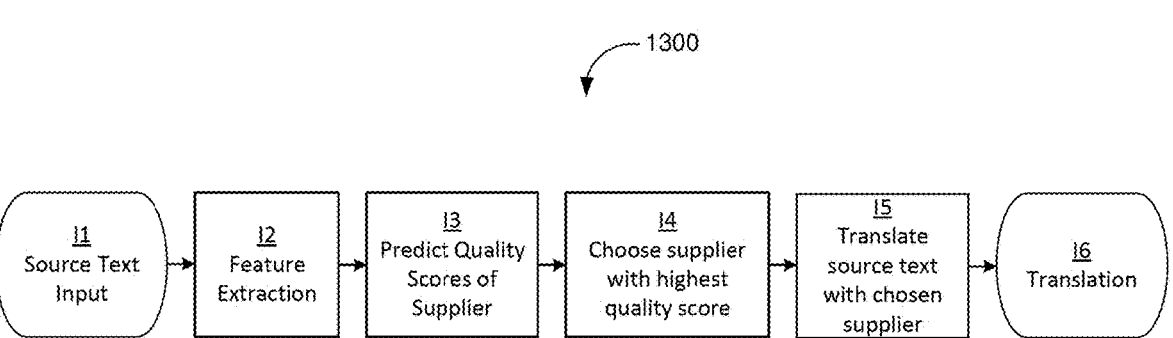
FIG. 13 is a flow diagram of a method for facilitating inference for the machine translation tasks, in accordance with some embodiments.

This section introduces an exemplary application of the system on the task of Machine Translation. FIG. 12 summarizes the training process of the system, while FIG. 13 summarizes the inference part.

Data

Referring to FIG. 12, in order to train and evaluate the System application in Machine Translation (MT), at C1, a corpus of 125k parallel texts in 10 language pairs, cs-en, deen, de-fr, en-cs, en-de, en-ti, en-ru, en-zh, fr-de, ru-en, was used. 12,500 parallel texts for each language pair are collected from datasets of an OPUS repository, such as (e.g., Open-Subtitles Corpus, TED 2013/2020, and Europarl) and randomly sampled).

Next, at C2, the source texts are translated using 6 MT solutions, 5 private MT services, and an open-source application (e.g. S={s1, . . . , S6}). Thereafter, at C3, the fluency of the machine translations is automatically measured with popular metrics such as BLEU, chrF++, and COMET-DA. Referenceless quality estimation metrics such as COMET-OE and the cosine similarity between the sentence BERT vectors of source and machine-translated texts (SBERT) may also be used. During the experiments, a fluency regression may also be trained for each metric.

At C4, after each instance of a dataset is built, and the dataset now consists of the source text, reference translation, machine translation by each MT supplier, and its fluency scores based on the five metrics (e.g., BLEU, chrF++, COMET-DA, COMET-OE and SBERT). The dataset is split into a training set of 1 OOK, whereas validation and test sets were built with 12,500 instances each.

Approach

Now referring to FIG. 13, based on the data previously generated in FIG. 12 and inputted at 11, at 12, features of the input are extracted (e.g., by a fluency Q scorer). Next, at 13, the six suppliers are rated by predicting the fluency scores of their potential translations (following the chosen metrics such as BLEU, chrF++, etc.) to a source text. Thereafter, at 14, among the six suppliers, the supplier with the highest predicted score is chosen so that at 15, the supplier's output translation is selected as the one which best fits the source text in terms of fluency (e.g., argmax Q(/,Si)).

Referring back to FIG. 12, given the parallel corpus between source texts inputted at T1 and the supplier quality score of the corresponding translations that is determined at T2, the training process of the model starts at T3, where features of the source texts are extracted. The representation of a source text consists of 5 groups of features, which include Count, PoS, NER, Morph, and Language. Count features consist of the number of tokens, characters, and the average word length of the source text. PoS features are the frequency of Part-of-Speech labels, such as nouns (NOUN), verbs (VERB), adjectives (ADJ), etc. Here, NER refers to the frequency of Named Entity Recognition labels, like a person (PER), location (LOC), organization (ORG), etc Morph represents the frequency of morphological features such as Num Gender=Fem, Num Gender=Masc, Num Aspect=Imp, etc. These features were automatically extracted from the source texts using Stanza. Finally, the source and target languages are added as features (Language).

After feature extraction, at T4 the system's Q functions are trained as multi-output regressions. Given the input representation of a source text, the model will learn to predict a vector with six continuous values, each representing the rating of a potential translation by a target supplier to the source text. In an embodiment, models are trained using the Auto Scikit-Learn framework.

Next, at T5, the approaches are evaluated by comparing the chosen translations with their corresponding Gold-references based on the same metric used as the objective function of the model. For instance, translations chosen based on the scores predicted by a BLEU regression are compared with their gold-standard references using BLEU. The models were also evaluated according to financial cost. The disclosure investigates whether the cost of translation could be reduced by fine-graining the choice for an MT supplier per source instance instead of choosing one per language or a single one to translate the entire dataset. The costs of models for comparison are depicted as the variation in percentage from the cost of a proposed approach. For example, for supplier 6, the open-source solution, an execution cost of $4 may be computed. Also, Multi-output regressions may be trained with the Auto Scikit-Learn framework for 30 minutes, 1 hour, and 2 hours. Among the 3 versions evaluated at T5 based on training duration, the one with the best performance in the development set is picked at T6.

Baselines

Results for each one of the single MT suppliers are reported, (i.e., the scenarios where the entire test set would be translated by one MT supplier are hypothetically considered). Finally, an upper bound model for comparison is built, which always chooses the gold standard supplier.

Results

Figure 14:
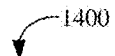
FIG. 14 is a table depicting fluency scores and financial cost variation based on translations by single suppliers versus other suppliers chosen based on a fluency regression, in accordance with some embodiments.

Referring to FIG. 14, Table 1400 depicts the fluency scores of the translations produced by every single supplier as well as by the models for comparison in contrast to the ones chosen based on the fluency supplier regression. The translations picked by this approach obtained the highest scores in all the five metrics. From the single suppliers, the performance of Supplier 4 is highlighted for two reasons: (1) its higher fluency scores, ranked first among the single suppliers for BLEU and chrF++, and (2) for being the cheapest service. For the COMET-OE and COMET-DA metrics, Supplier 3 presents the best scores, although, together with Supplier 5, is the most expensive approach in terms of costs.

Figure 15:
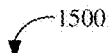
FIG. 15 is a table depicting fluency Scores and financial cost variation based on translations by language versus other suppliers chosen based on fluency regression for COMET-DA metric for first five language pairs, in accordance with some embodiments.
Figure 16:
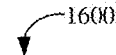
FIG. 16 is a table depicting fluency scores and financial cost variation based on translations by language versus other suppliers chosen based on fluency regression for COMET-DA metric for last five language pairs, in accordance with some embodiments.

Referring to FIGS. 15 and 16, Tables 1500 and 1600 depict the COMET-DA scores of the models for comparison and a particular approach for each of the 10 language pairs. The model created introduces the best results for all language pairs, except for ru-en. The highest differences among the particular approach and the best single supplier were obtained in cs-en (+1.75%), fr-de (+1.40%), and en-cs (+0.82%), Based on the tables' results, the approach has obtained the best results in all automatic metrics and in 9 out of 10 language pairs, the results of the Upper Bound approach show that more improvements can be made.

System Application on Automatic Speech Recognition

Figure 17:
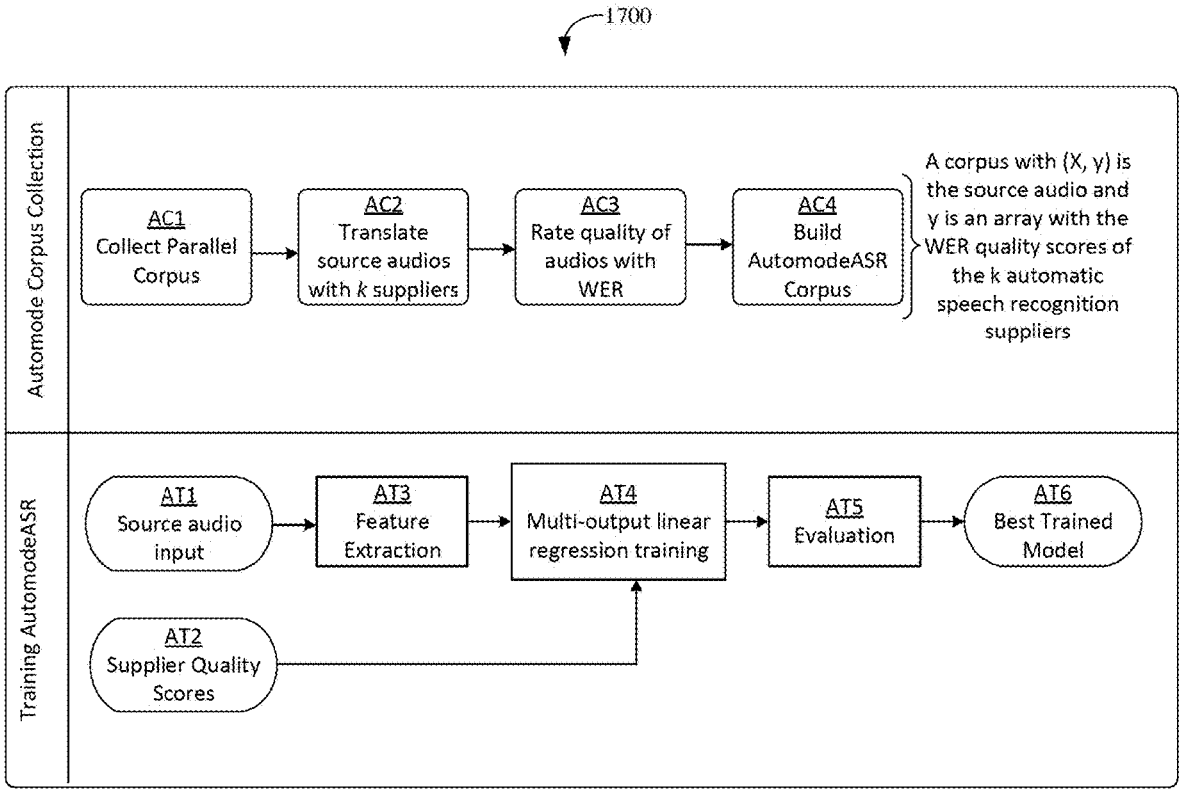
FIG. 17 is a flow diagram of a method for facilitating training models of System application for speech recognition tasks, in accordance with some embodiments.
Figure 18:
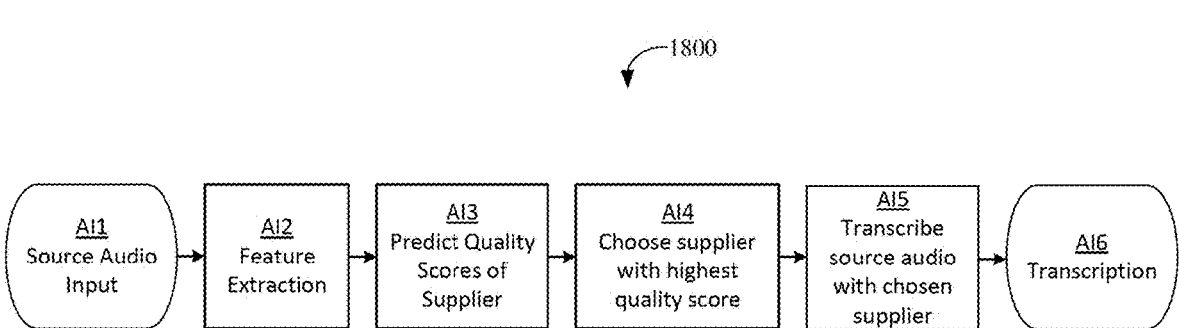
FIG. 18 is a flow diagram of a method for facilitating inference for the speech recognition tasks, in accordance with some embodiments.

This section describes the exemplary application of the system to the task of Automatic Speech Recognition. FIG. 17 summarizes the training process of the application and FIG. 18 summarizes the inference part.

Data

Referring to FIG. 17, at AC1, data from training, validation, and test sets of Common Voice and LibriSpeech, two popular corpora in the speech processing research field are sampled.

Figure 19:
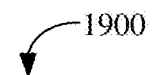
FIG. 19 is a table depicting a number of speech audio and corresponding transcriptions extracted from a dataset associated with the speech recognition tasks, in accordance with some embodiments.

In Common Voice, data from the English, German, French, Russian and Chinese parts of the corpus are sampled. Table 1900, as shown in FIG. 19, depicts the number of speech audios and the corresponding transcriptions extracted from this dataset.

LibriSpeech is a corpus with speech audio and transcriptions only in English. From this corpus 1,748, 690, and 737 pairs are extracted from training, development, and test sets, respectively.

Referring back to FIG. 17, at AC2 for each language, the source audios were translated using the 5 ASR services (e.g. S={s1, . . . , ss}). Next, at AC3, the quality of the transcriptions is automatically measured using the Word Error Rate (WER). As a result, at AC4, an System corpus for Automatic Speech Recognition (ASR) consists of (X, y) instances, where Xis the source audio and y is an array with the WER quality scores of the k ASR suppliers.

Approach

Referring now to FIG. 18, based on the data previously described, for each audio inputted at Al 1 in a particular language, at Al 1 the system for the ASR consisting of a Q scorer extracts the features of the input at Al2. Then, at Al3, the quality of the five suppliers are rated by predicting the WER scores of their potential transcriptions to the source audio. At Al4, among the five suppliers, the one with the highest predicted quality score is chosen. Next, at Al5, the source audio is transcribed using the (e.g., argmax Q(/,Si)).

Referring back to FIG. 17, given the parallel corpus between source audios inputted at AT1 and the suppliers' WER scores of the corresponding transcriptions supplied at AT2, the training process of the model starts by extracting the features of the inputted source audios at AT3. The representation of source audio may include the gender and age of the speaker, the duration of the audio, and an embedding representation of the audio produced by SpeakerNet.

After feature extraction, at AT 4 the Q functions were trained as linear regressions. A grid search on the development set is performed to choose epochs (among 20, 30), early stop (3, 5, 8), dropout (0, 0.1, 0.3, 0.5) and learning rate (among 0.01, 0.05, 0.1) settings. The batch size is set to 32.

Next, at AT5, the approaches were evaluated by comparing the chosen translations with their corresponding Gold-references based on the WER metric, used as the objective function of the model. Thereafter, at AT6, the one with the best performance in the development set is picked.

Baselines

Results for each one of the single ASR suppliers are reported, i.e. the scenarios where the entire test set would be transcribed by one ASR supplier are hypothetically considered. Finally, an upper bound model is built for comparison, which always chooses the gold standard supplier.

Results

Figure 20:
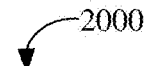
FIG. 20 is a table depicting WER scores per language in a test set associated with the speech recognition tasks, in accordance with some embodiments.

Referring to FIG. 20, Table 2000 shows the WER scores per language of the transcriptions produced by every single supplier, and by the models for comparison in contrast to the ones chosen based on System application in the test set. Supplier 2 is the one that obtained the best scores for all the languages, except for English and Russian, where the System application had the best results.

Although System did not get the best results for 3 out of the 5 languages, the results are very close to the best supplier. Moreover, with more training data, the framework could be fine-tuned even more and would probably overcome the best supplier. This can be proven by the leading results in the English language, where System is trained in two corpora instead of one as in the other languages Similar Applications Further, the System can be related to Quality Estimation (QE) Metrics since also aims to reduce costs. In the application of Machine Translation, QE metrics, such as COMET-OE aim to evaluate the output of a machine translation system without access to reference translations, which usually imposes high costs to be obtained. In terms of cost reduction, the System goes further since it aims to take a decision about a good translation solely based on the source document. In this context, candidate translations, which would require executing multiple MT services, are not even needed.

Further, the System can also be related to the task of Multi-System Machine Translation (MSMT), whose aim is to select the best translation to a source text from a pool of different candidate translations by different suppliers. Different from QE, MSMT shares the same goal with the System, but also establishes higher costs once, similar to QE, requires candidate translations.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to further the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and Bin combination; Band C in combination; A and C in combination; A, B, and C in combination; 2A and C in combination; A, 3B, and 2C in combination; and the like.

What is claimed is:

1. A method comprising:
instructing individual software applications of a plurality of software applications to process individual tasks of a plurality of tasks;
determining a plurality of outputs resulting from the individual software applications processing the individual tasks;
determining, based on the plurality of outputs, individual performance scores associated with individual software applications of the plurality of software applications;
determining individual features of a plurality of features associated with a plurality of task data associated with the plurality of tasks;
receiving task data associated with at least one task from a user device, the task data comprising textual content, audio content, video content, or audio-video content;
determining at least one feature associated with the task data based on analyzing the task data;
predicting, using at least one machine learning model, the individual performance scores associated with the individual software applications of the plurality of software applications that have processed the at least one task;
selecting at least one software application from the plurality of software applications based at least in part on an associated predicted performance score;

generating a recommendation of the at least one software application based at least in part on the associated predicted performance score;
transmitting the recommendation to the user device;
instructing the at least one software application to process the task data;
determining an output of the at least one software application after processing the task data; and
transmitting the output to the user device.

2. The method of claim 1, wherein creating the at least one machine learning model comprises training at least one untrained machine learning model using:
the plurality of features associated with the plurality of task data; and
the individual performance scores associated with the individual software applications processing the individual tasks.

3. The method of claim 1, further comprising:
retrieving a plurality of task data associated with a plurality of tasks;
instructing the plurality of software applications to process the plurality of tasks based on the plurality of task data;
determining a plurality of outputs resulting from the plurality of software applications processing the plurality of tasks;
generating a plurality of performance scores associated with the plurality of software applications based on the plurality of outputs; and
extracting a plurality of features associated with the plurality of task data based on analyzing the plurality of task data.

4. The method of claim 3, further comprising:
analyzing the plurality of outputs using at least one performance metric, wherein the at least one performance metric is used for measuring a performance of the plurality of software applications; and
generating a value for the at least one performance metric for each of the plurality of outputs generated using the plurality of software applications based on analyzing the plurality of task data and the plurality of outputs, wherein generating the plurality of performance scores associated with the plurality of software applications is further based on the value for the at least one performance metric.

5. The method of claim 1, further comprising:
transmitting the plurality of outputs and the plurality of task data to one or more additional devices;
receiving, from the one or more additional devices, a plurality of user ratings associated with the plurality of outputs; and
determining a plurality of performance scores associated with the plurality of software applications based at least in part on analyzing the plurality of user ratings.

6. The method of claim 1, further comprising:
retrieving a plurality of reference outputs to the plurality of tasks based on the plurality of task data; and
analyzing the plurality of reference outputs and the plurality of outputs;
wherein generating a plurality of performance scores associated with the plurality of software applications further comprises analyzing the plurality of reference outputs and the plurality of outputs.

7. The method of claim 1, wherein:
the at least one machine learning model comprises at least one machine learning multi output regression model; and the at least one machine learning model is trained using a scikit-learn framework or pytorch.

8. The method of claim 1, further comprising:

determining a performance score of each of the plurality of software applications, the performance score measuring at least one of:

a quality score, a fluency score, a speed score, a resource utilization score, or any combination thereof.

9. The method of claim 1, further comprising:

analyzing the at least one feature using at least one first machine learning model, wherein:

the at least one first machine learning model is trained to predict a feasibility score associated with each of the plurality of software applications capable of performing the at least one task; and selecting the at least one software application from the plurality of software applications is further based on the feasibility score.

10. The method of claim 1, wherein:

analyzing the task data comprises analyzing the task data using a second machine learning model; and extracting the at least one feature further comprises analyzing the task data using the second machine learning model.

11. A server comprising:

one or more processors; and one or more non-transitory computer-readable storage media to store instructions executable by the one or more processors to perform operations comprising:

instructing individual software applications of a plurality of software applications to process individual tasks of a plurality of tasks;

determining a plurality of outputs resulting from the individual software applications processing the individual tasks;

determining, based on the plurality of outputs, individual performance scores associated with individual software applications of the plurality of software applications;

determining individual features of a plurality of features associated with a plurality of task data associated with the plurality of tasks;

receiving task data associated with at least one task from a user device, the task data comprising textual content, audio content, video content, or audio-video content;

determining at least one feature associated with the task data based on analyzing the task data;

predicting, using at least one machine learning model, the individual performance scores associated with the individual software applications of the plurality of software applications that have processed the at least one task;

selecting at least one software application from the plurality of software applications based at least in part on an associated predicted performance score;

generating a recommendation of the at least one software application based at least in part on the associated predicted performance score;

transmitting the recommendation to the user device;

instructing the at least one software application to process the task data;

determining an output of the at least one software application after processing the task data; and transmitting the output to the user device.

12. The server of claim 11, wherein creating the at least one machine learning model comprises training at least one untrained machine learning model using:

the plurality of features associated with the plurality of task data; and the individual performance scores associated with the individual software applications processing the individual tasks.

13. The server of claim 11, the operations further comprising:

retrieving a plurality of task data associated with a plurality of tasks;

instructing the plurality of software applications to process the plurality of tasks using the plurality of task data;

determining a plurality of outputs corresponding to results of the plurality of software applications processing the plurality of tasks;

generating a plurality of performance scores associated with the plurality of software applications based on the plurality of outputs; and extracting a plurality of features associated with the plurality of task data based on analyzing the plurality of task data.

14. The server of claim 13, the operations further comprising:

analyzing the plurality of outputs using at least one performance metric, wherein the at least one performance metric is used to measure a performance of the plurality of software applications;

generating a value for the at least one performance metric for each of the plurality of outputs generated using the plurality of software applications based on analyzing the plurality of task data and the plurality of outputs; and generating the plurality of performance scores associated with the plurality of software applications based at least in part on the at least one performance metric.

15. The server of claim 13, the operations further comprising:

transmitting the plurality of outputs and the plurality of task data to one or more additional devices;

receiving, from the one or more additional devices, a plurality of user ratings associated with the plurality of outputs; and determining the plurality of performance scores associated with the plurality of software applications at least in part on analyzing the plurality of user ratings.

16. One or more non-transitory computer-readable storage media to store instructions executable by one or more processors to perform operations comprising:

instructing individual software applications of a plurality of software applications to process individual tasks of a plurality of tasks;

determining a plurality of outputs resulting from the individual software applications processing the individual tasks;

determining, based on the plurality of outputs, individual performance scores associated with individual software applications of the plurality of software applications;

determining individual features of a plurality of features associated with a plurality of task data associated with the plurality of tasks;

receiving task data associated with at least one task from a user device, the task data comprising textual content, audio content, video content, or audio-video content;

determining at least one feature associated with the task data based on analyzing the task data;

predicting, using at least one machine learning model, the individual performance scores associated with the individual software applications of the plurality of software applications that have processed the at least one task;

selecting at least one software application from the plurality of software applications based at least in part on an associated predicted performance score;

generating a recommendation of the at least one software application based at least in part on the associated predicted performance score;

transmitting the recommendation to the user device;

instructing the at least one software application to process the task data;

determining an output of the at least one software application after processing the task data; and transmitting the output to the user device.

17. The one or more non-transitory computer-readable storage media of claim 16, the operations further comprising:

instructing the at least one software application to process the at least one task;

determining an output of the at least one software application after processing the at least one task; and transmitting the output to the user device.

18. The one or more non-transitory computer-readable storage media of claim 16, the operations further comprising:

retrieving a plurality of task data associated with a plurality of tasks;

instructing, using the plurality of task data, the plurality of software applications to process the plurality of tasks;

determining a plurality of outputs corresponding to the plurality of software applications completing processing the plurality of tasks;

generating a plurality of performance scores associated with the plurality of software applications based on the plurality of outputs; and extracting a plurality of features associated with the plurality of task data based on analyzing the plurality of task data.

19. The one or more non-transitory computer-readable storage media of claim 18, the operations further comprising:

analyzing the plurality of outputs using at least one performance metric, wherein the at least one performance metric is used to measure a performance of the plurality of software applications;

generating at least one value for the at least one performance metric for each of the plurality of outputs generated using the plurality of software applications based on analyzing the plurality of task data and the plurality of outputs; and generating the plurality of performance scores associated with the plurality of software applications based at least in part on the at least one value for the at least one performance metric.

20. The one or more non-transitory computer-readable storage media of claim 18, the operations further comprising:

transmitting the plurality of outputs and the plurality of task data to one or more additional devices;

receiving, from the one or more additional devices, a plurality of user ratings associated with the plurality of outputs; and determining the plurality of performance scores associated with the plurality of software applications at least in part on analyzing the plurality of user ratings.

* * * * *